Oct. 9, 1934.  R. HOOVER  1,976,398

ELECTRICAL SELECTING AND INDICATING SYSTEM

Filed Nov. 11, 1929  5 Sheets-Sheet 4

INVENTOR
Ray Hoover
BY
Eugene C. Brown
ATTORNEY

Patented Oct. 9, 1934

1,976,398

UNITED STATES PATENT OFFICE 1,976,398

ELECTRICAL SELECTING AND INDICATING SYSTEM

Ray Hoover, North Plainfield, N. J., assignor to The Western Union Telegraph Company, New York, N. Y., a corporation of New York Application November 11, 1929, Serial No. 406,357

14 Claims. (Cl. 177—353)

This invention relates to electric signaling and indicating means and more particularly to a method of and apparatus for translating predetermined electric signals into selecting and indicating impulses, whereby information concerning a large number of different items may be visibly indicated at a plurality of distant stations all controlled over a relatively small number of line wires from a common transmitting station.

The invention is especially applicable to the indicating or posting of varying quotations or prices of a multitude of items such as stocks, bonds and commodities and the present description, for the purpose of explaining the invention, will be confined to an automatic stock quotation board and to the selecting and indicating mechanism therefor, although it is to be understood that the invention is not limited thereto.

The transmission of code signals corresponding to the desired quotation may be controlled from a common point, such as a stock exchange and distributed to receiving and translating apparatus disposed in brokers' offices, banks, and similar places so that the quotations will be posted automatically and with a minimum delay. The present invention is concerned only with the apparatus and methods employed at the receiving stations.

The information concerning each stock quotation which it is generally desired to post in a broker's office comprises the "open", "high", "low" and "last" quotation of each stock in which the particular broker and his customers are interested, together with certain information concerning the past history of the stock, such as, "yesterday's close". The numerical value of the quotation may involve four digits, such as hundreds, tens, units and fractions. It is necessary, therefore, to provide on the quotation board or blackboard for each item or stock, five sets of indicators, namely, the "yesterday's close", "open", "high", "low", and "last" sets, each set having four indicator units for posting the hundreds, tens, units and fractional values of the stock.

The receiving apparatus in response to the transmitted signals must, therefore, select the stock to be posted, select the range, i. e., whether the "open", "high", "low", "last" or "yesterday's close" quotation and repeat the indicator operating impulses selectively to each of the indicator units of the group or range selected.

It is obviously impractical to control the indicators at a plurality of brokers' offices from a central transmitting station through the use of a separate line connection for each stock. Accordingly, it is desirable to provide means for transmitting current impulses, representative of the quotations of the numerous stocks, over a relatively small number of line wires and to provide selecting means at each indicating board to choose the particular stock and range, the quotation of which it is desired to post. The reduction of the line wires to a relatively small number requires that the selecting and indicating means be operated at a high speed in order to take care of the rate at which the sales are made at the stock exchange.

Taking into account the reasonable future requirements, the selecting and indicating apparatus should be capable of selecting anyone of a thousand or more different stocks or items and to operate at least four indicator units for each quotation and in the event that the "high" or "low" quotations are transmitted simultaneously with the "open" or "last" quotations, at least eight indicator units must be actuated. With the present rate of transactions conducted at the stock exchange the system must be capable of responding to, from thirty to sixty new quotations per minute.

It has been proposed, heretofore as shown in United States patent to Haselton, No. 1,890,876 and United States patent to Haselton, et al. 1,890,878, both granted December 13, 1932, to select and operate the desired indicator units through a total of four transmitting or control channels extending between the transmitting and receiving stations; such channels comprising either four separate line wires or two line wires having battery of positive and negative polarity applied to each line in conjunction with polarized relays at the receiving station for responding to the direction of current transmitted over each of the lines. Obviously a single line wire could be employed with a rotary transmitter at the sending station and a synchronously rotating distributor at the receiving station for distributing the signal impulses to the four control channels of the receiving apparatus.

The four control channels are employed for selecting concurrently, the range and stock. For this purpose each group of indicators comprising the range, i. e., "yesterday's close", "open", "high", "low" and "last" and combinations thereof are designated by a single digit number; the "last" quotation, for instance, being designated (1); "low and last", (2); "high and last", (3); "low" (4); "high" (5); "open" (6); "high and open" (7); "yesterday's close" (8); "wipe out" (9); and "unison" (10).

Similarly each stock is arbitrarily designated by a three digit number, the stocks having the greatest volume of sales and hence those most often quoted, being designated by digits of low order as 111, 121, 211 and so forth.

The range is selected by transmitting over channel one, for instance, a number of impulses corresponding to the digit number of the range to be posted and the stock is selected by sending over channels two, three and four impulses corresponding in number to the hundreds, tens and unit digits, respectively, of the stock designating number. The receiving apparatus in response to such impulses selects the stock and range and subsequently operates to transfer the four transmitting channels from the selecting mechanism to the four indicating units of the range and stock selected. Each indicator unit may then be operated by transmitting the required number of impulses over the channels connected thereto.

In order to eliminate accumulative errors, means is preferably provided for restoring each indicator to "blank" position before transmitting the quotation or answer. The restoration has been accomplished, in the systems heretofore proposed, by either transmitting a series of ten impulses over each channel, to step the indicators around to "blank" position or by transmitting a release signal to release the indicator and permit it to return to its normal position under the action of a spring.

After the completion of the transmission of a quotation, the receiving mechanism is restored to its normal position in readiness to respond to the succeeding quotation.

The present invention relates to a stock quotation indicating system of the above general nature, one of the objects being to provide apparatus which will be free from "time" relays and in which the range selection, stock selection and indicator control mechanism will be operated rapidly, dependably and accurately in response to the transmitted signal impulses.

A further object is to provide such a system in which the restoration of the indicators, prior to posting a new quotation will be controlled locally, i. e., at the receiving station and hence be independent of transmitted signals.

Still further objects are to increase the speed and certainty of operation of the system; to regenerate the transmitted indicator operating signals and to provide a definite and uniform length of cycle for the posting of each quotation.

Other and more specific objects and advantages of the invention will more fully appear from the following description taken in connection with the accompanying drawings and appended claims.

In accordance with my invention I provide a rotary distributor of the start-stop type at the receiving station which operates in synchronism with the transmitted signals to distribute them to the selecting relays and to the units of the indicator groups. The distributor is divided into three main sections preferably of substantially equal length and corresponding to ten cycles of alternate, positive and negative impulses. The first section of the distributor controls the operation of the range and stock selecting relays in response to transmitted code signals, the second section supplies locally the ten restoration impulses for the indicator relays selected by the first section, for the purpose of restoring them to "blank" position and the third section controls, and through associated polarized relays regenerates the transmitted impulses for stepping the indicator units around to post the desired quotation.

The segments constituting tthe first section are therefore, termed the "selecting group", those of the second section, the "restoration group" and those of the third section, the "answer group" or "regenerating group".

The receiving apparatus is provided with two such rotary distributors each operating from two of the four control channels. Thus, for instance, one rotary distributor may respond to impulses transmitted over channels one and two to select the range and the hundreds digit of the arbitrary numerical stock designation and the other distributor may select the tens and units digits of the stock designating number. Both distributors operate in unison so that the range and stock is selected simultaneously.

After the range and stock selection is completed, the windings of the set or sets of indicators which have been chosen at the quotation board are connected to the segments of the restoration and regenerating groups of the distributors. This connection is effected by battery connections completed through the rotary distributors as their brushes pass from the selecting group of segments to the restoration group. Section two of one of the distributors controls the restoration of the hundreds and units indicators to normal and section two of the other distributor resets the tens and fractions indicators to normal. In a like manner section three of one of the distributors controls and regenerates the indicator operating impulses of the hundreds and units indicators while section three of the other distributor functions similarly with respect to the tens and fractions indicator units.

Each distributor has associated therewith, two banks of polarized relays, one for each control channel. The windings of the polarized relays are joined to the segments of the distributors in such manner as to be successively connected to the channel over which the signals are being transmitted as the brushes of the distributors pass over the segments, so that the relays will operate in response to such signals. The polarized relays store up the range and stock selected until the distributor brush passes from the selecting group of contacts of the distributor at which time, as stated above, a circuit is completed which serves to connect the windings of the operating magnets of the group of indicators previously selected, to the segments of the rotary distributors. The restoration impulses are supplied to the indicator units locally through the distributors and the "answer" impulses, which control the final setting of the indicator dials are, transmitted over the four control channels to the "answer" group (section three) of the distributors, regenerated through the segments of the "regenerating" group and supplied to the indicator magnets.

After the restoration and indicator operating impulses have been completed the system is restored to normal by a circuit completed through the final contacts of the distributor. The distributor then comes to rest until the succeeding stock quotation is transmitted. The first impulse of the range and stock selecting trains of impulses serve as start impulses for the distributors and operate the starting magnets to permit the distributor brushes to make one revolution or one complete cycle of operation.

In order that the invention may be more fully understood, reference will be had to the accompanying drawings in which.

Figure 2:
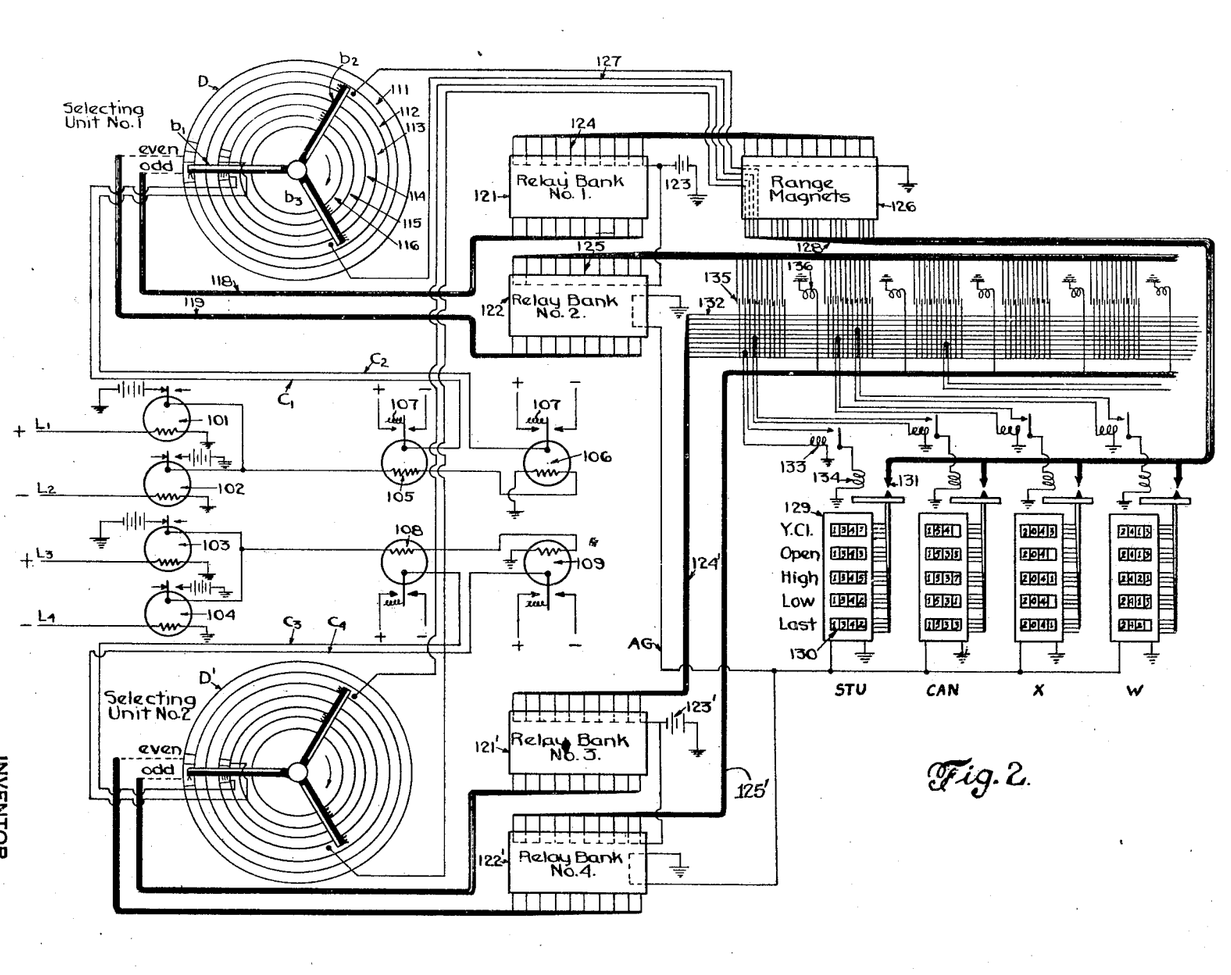
Figure 2 is a diagrammatic illustration of a complete receiving equipment embodying the invention.
Figure 3:
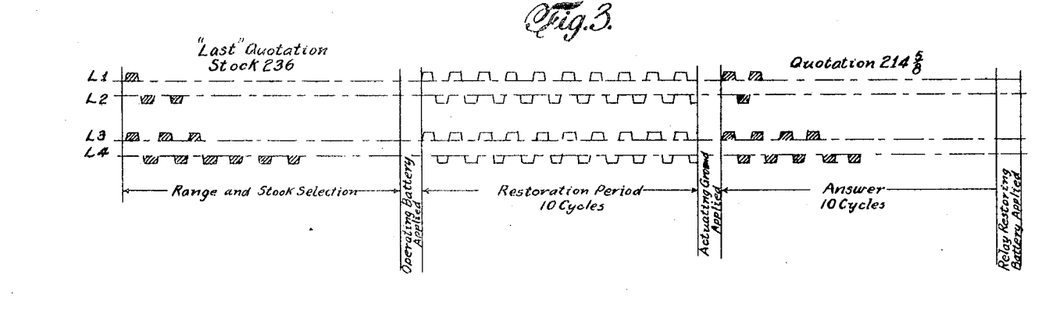
Figure 3 is a current-time diagram showing the groups of current variations transmitted over the four channels for controlling the receiving system of Figures 1 and 2 and illustrating one particular range, stock and answer.

Referring first to Figures 2 and 3 for a description of the general arrangement and essential units of the system and the nature of the signals to which it responds, it will be noted that four lines, indicated as $L_1$, $L_2$, $L_3$ and $L_4$, are provided over which the signals are transmitted from the central sending station, as for instance, a stock exchange. At a repeating station the lines $L_1$ to $L_4$ are connected to one end of the windings of polarized relays 101, 102, 103 and 104, the opposite ends of such windings being grounded, as shown. Positive impulses are transmitted over lines $L_1$ and $L_3$ and negative impulses over lines $L_2$ and $L_4$. Lines $L_1$ and $L_2$ are grouped together at the transmitting station so that when impulses of one polarity are being transmitted over one line the opposite line is idle.

The signals transmitted over any one line comprise impulses of definite period and polarity separated by an open circuit condition of the line of equal or greater period, the transmitting mechanism being arranged so that the signal impulses transmitted over $L_1$ for instance, occur during the open circuit condition of line $L_2$ and vice versa. Lines $L_3$ and $L_4$ are similarly grouped so that the signals over one line are interposed between those transmitted over the other line. For convenience, a positive impulse over one line, as $L_1$ and an adjacent negative impulse over the other line, as $L_2$, is termed a cycle and the total time required to select the range and stock comprises ten of such cycles. The group of impulses employed for making the stock and range selection are for convenience termed the "selecting train".

If, in accordance with the example illustrated in Figure 3, it is desired to post the "last" quotation of a stock arbitrarily designated by the number 236, a single positive impulse would be transmitted over line $L_1$ since as previously explained the "last" quotation was arbitrarily designated by the number one. Concurrently two spaced negative impulses, corresponding to the hundreds digit of the numerical stock designation, would be transmitted over line $L_2$, three positive impulses, corresponding to the tens digit, would be transmitted over line $L_3$ and six negative impulses, corresponding to the units digit, would be transmitted over line $L_4$. These trains of selecting impulses serve to actuate the selecting mechanism at the receiving station to place the "last" indicator group of stock number 236 in communication with the four lines $L_1$ to $L_4$, through the segments of the rotary distributors.

Referring again to Figure 2, each of the line relays 101 to 104 is provided with battery connections whereby when positive impulses are transmitted over lines $L_1$ and $L_3$, positive battery, is applied to the tongues of the relays 101 and 103 and similarly when negative battery is applied to lines $L_2$ and $L_4$ negative battery is also applied to the tongues of relays 102 and 104. The tongues of relays 101 and 102 are connected together and by a line wire to the windings of two polarized relays 105 and 106 having their windings in series and oppositely disposed.

The stationary contacts of relays 105 and 106 are connected to battery of opposite polarity and the tongues are biased, as by a spring 107, towards the positive contact. The windings of relays 105 and 106 are arranged so that relay 105 operates in response to a positive impulse repeated from relay 101 to connect the conductor $C_1$ to negative battery and relay 106 operates in response to negative impulses repeated from relay 102 to connect the line $C_2$ to negative battery. The conductors $C_1$ and $C_2$ constitute control channels one and two for the receiving apparatus. Lines $C_3$ and $C_4$ are similarly energized through relays 108 and 109 by signals repeated from the lines $L_3$ and $L_4$, and constitute control channels three and four.

The relays 101, 102, 103 and 104 constitute a repeater which may be located at the transmitting station or at a repeater station.

The selecting apparatus comprises two exactly similar units, for convenience called selecting unit number one and selecting unit number two. The parts constituting selecting unit number two are indicated by the same reference characters, primed, as are employed in connection with selecting unit number one.

The selecting units comprise the rotary distributors D and D' each having three sets of contact rings designated as 111, 112, 113. 114, 115 and 116. Rings 111 and 114 are bridged by a brush $b_1$, rings 112 and 115 by a brush $b_2$ and rings 113 and 116, by a brush $b_3$. Brushes $b_1$, $b_2$ and $b_3$ are set 120 degrees apart.

Deferring for the present, a detailed description of the arrangement of the distributor segments, suffice it to say for the purpose of the present general description that channels $C_1$ and $C_2$ are connected to the distributor contacts in such manner that as the brush $b_1$ passes over the distributor segments the channels $C_1$ and $C_2$ are alternately connected to successive wires of two groups, 118 and 119, of ten wires each, the odd segments completing the circuit through group 118 and the even segments completing the circuit through group 119. The wires of groups 118 and 119 are connected with the windings of two banks of polarized relays 121 and 122, so as to set up certain of said relays depending upon the number of selecting impulses transmitted over each channel. A local battery 123 is thus connected through the contacts of one of the relays of each bank, to one wire of each of two groups of ten wires 124 and 125.

Referring again to the example illustrated in Figure 3, if the "last" quotation is to be transmitted, the first wire of group 124 (corresponding to one transmitted positive impulse over $L_1$ would be connected to the battery 123. The wires of the group 124 terminate at the windings of a number (10) of "range" magnets 126 which have appropriate contacts for connecting a group of four wires 127 with one or more of a number of four wire groups 128. The wires of group 127 are joined to the indicator segments of the distributor and are connected to the four channels $C_1$, $C_2$, $C_3$ and $C_4$ during the transmission of the "answer" or quotation. The wires comprising the groups 128 extend to the windings of the magnets of the individual indicator units.

The indicator or quotation board, designated generally at 129, comprises five sets of indicating units for each stock, such sets corresponding to the "yesterday's close", "open", "high", "low" and "last" quotation. Each set includes four indicator units disposed behind suitable openings or windows 130 and corresponding to the hundreds, tens, units and fractional values of the quotation or "answer".

The operation of one of the "range" magnets 126 connects the four wires 127 to the magnets of the four indicator units of one or more sets of indicators, through a multi-contact switch 131.

It should be noted that the wires of group 128 which are connected to the conductors 127 extend to each of the multi-contact switches 131, for the entire board. It is the function of the stock selecting mechanism to operate one of the switches 131 and thus connect the wires 127 directly to one or more sets of indicator units for the particular stock selected.

The stock selection is effected through a grid arrangement 132. The grid comprises a series of ten horizontal conductors and ten groups of vertical conductors, each group comprising ten conductors. Five only of such groups of vertical conductors are shown in Figure 2. Each intersection of the vertical and horizontal conductors provides for the selection of an individual item or stock and the ten vertical groups of ten conductors each, provide facilities for selecting a total of 999 different stocks having three digit designating numbers. The vertical conductors of each group are connected to the hundreds digit wires 125, extending from relay bank 122 and the horizontal conductors are connected to the tens digit wires terminating at relay bank 121'.

The grid is provided at each intersection of a vertical and horizontal conductor with facilities for a plug connection whereby any indicator panel may be selected from such intersection. The plug connection has two terminals one connecting with the horizontal conductor and the other with the vertical conductor. The terminal connected with the vertical conductor is joined to the winding of a relay 133 and the terminal connected to the horizontal conductor is joined to the front contact of relay 133. The armature of the relay 133 is connected to the winding of a magnet 134 which when energized operates the multi-contact switch 131.

The stock selection is as follows:—

The signals corresponding to the hundreds digit of the arbitrary numerical stock designation operate relay bank 122 to connect battery 123 through one of the wires of the relay bank. In the example illustrated, Figure 3, in which the hundreds digit was two, the second vertical wire of each of the vertical groups of the grid 132 is thus connected to battery 123 but the circuit is held open at the multi-contact switches 135. The tens digit of the stock designating number determines the horizontal conductor of the grid which is connected to the battery 123' through relay bank 121' and the units digit determines the selection and operation of one of the series of ten magnets 136 which control the multi-contact switches 135.

Thus in case of stock number 236, vertical wire number two and horizontal wire number three of group six of the grid 132 would be connected to battery 123 and 123' respectively. All of the plug connections included at an intersection of a horizontal wire with vertical wire two of group six would receive current for operating the relays 133 but the circuit to relay 134 would be completed only through the particular plug which is located at the intersection of horizontal wire three with the vertical conductor two of group six and therefore only one of the multi-contact switches 131 would be closed to make the stock selection.

After the stock and range selection has been made in this manner the indicator units are operated step-by-step first to restore them to normal or blank position and subsequently to step them up to the desired reading.

The restoration of the indicators to blank position preceding the transmission of the "answer" or quotation is accomplished by supplying to the indicator magnets a series of ten impulses. This is sufficient to step the indicator completely around to the blank position in the most unfavorable setting thereof. After the indicator reaches the blank position it does not respond to further signals of the restoration group but is retained in such position until the commencement of the transmission of the "answer".

Figure 4:
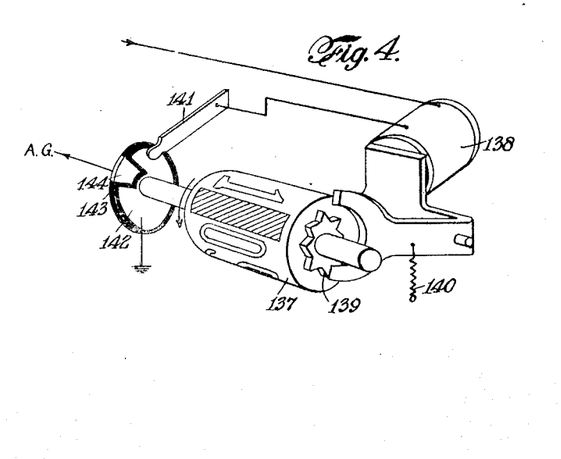
Figure 4 is a perspective view of the operating parts of one of the indicator units.

The operation of the indicator units will be clear from a reference to Figure 4. The indicator unit comprises a drum 137 having thereon numbers 1 to 9, 0 and blank. It is rotated by a magnet 138 through a pawl and star wheel ratchet 139. Each impulse supplied to the magnet 138 steps the drum ahead one half space and upon release of the magnet a spring 140, moves the drum the remaining half space. The circuit to the magnet 138 is completed through a brush contact 141 which rubs against a conducting disk 142 mounted upon the shaft of the drum 137. The disk 142 is grounded as shown and is discontinuous at a zone 143 at which place a second contact strip 144 is located and insulated from the disk 142. The contact 144 is so disposed relative to the blank portion of the drum that the brush contact 141 rests thereon when the blank portion of the drum is visible in the indicator panel.

Thus it will be apparent, that during the restoration period, as soon as the drum rotates to blank position, the ground connection for the magnet 138 will be broken by the brush passing off of contact 142 and on to the ungrounded contact 144. The magnet therefore will not be energized by subsequent restoration impulses. At the end of the restoration period the contact 144 is connected to ground by the rotary distributor in a manner to be subsequently described. The indicator magnet 138 is then in a condition to respond to the subsequent impulses constituting the "answer", to step the indicator drum around to the desired position. The ground connection to the contact 144 is for convenience termed the "actuating" ground.

It will be understood, of course, that various other types of indicators may be employed and the term "indicators" is used in the appended claims to include any device for displaying information.

Figure 1A:
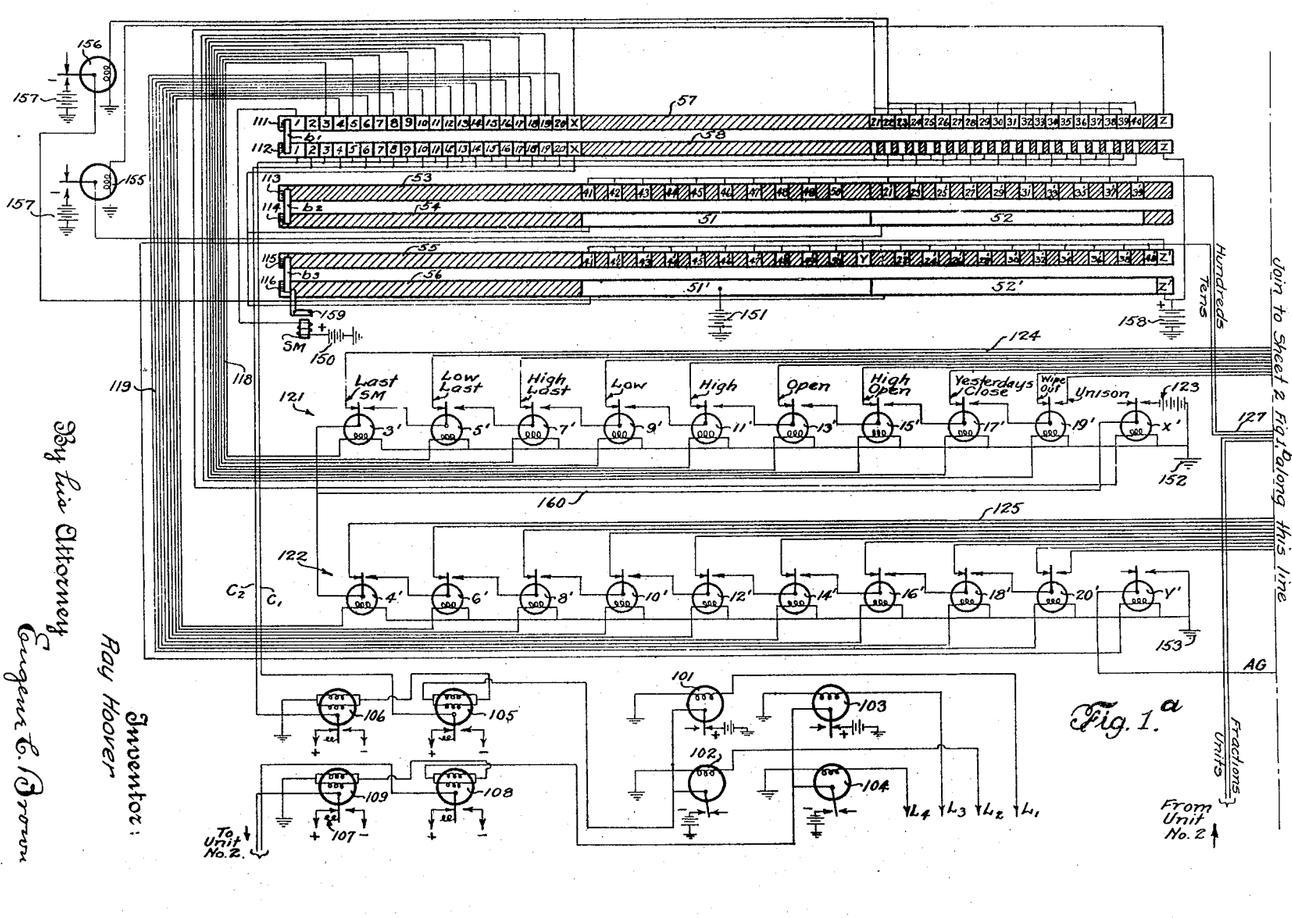
Figs. 1a and 1b comprise a schematic diagram showing, in part, the circuit arrangement and distributor segment arrangement of one embodiment of the invention.

Reference will now be had to Figure 1 for a detailed description of the selecting mechanism.

In Figure 1 the rotary distributor is shown "developed". Rings 111 and 112 are provided at one end with a series of segments numbered one to twenty. The alternate or odd numbered segments of ring 112 are strapped together and connected to transmitting channel $C_1$ and the even numbered segments are also strapped together and connected to transmitting channel $C_2$. On ring 111, segment 1 is joined by a conductor with one end of the winding of a starting magnet SM having its opposite end connected to a battery 150 of positive polarity. Contact 2 is dead or unconnected and contacts 3 to 20 are each connected to one end of the windings of the polarized relays indicated by the corresponding reference characters, primed. The odd contacts are connected in succession to the windings of the relays of bank 121 and the even contacts to the windings of the relays of bank 122.

The segments 1 to 20 comprise the selecting group for the range and stock. Following the selecting group, rings 111 and 112 are provided with a single segment X, X. Segment X of ring 112 is connected to battery 151 of negative polarity through a solid contact segment 51' of ring 116. Segment X of ring 111 is connected to one end of the winding of relay X'. The opposite ends of the windings of each of the polarized relays 3' to 20' and X' are grounded at 152 or 153.

Rings 113, 114, 115 and 116 are provided with insulating segments 53 to 56 over which their brushes $b_2$ and $b_3$ pass during the passage of brush $b_1$ over the selecting group of segments 1 to 20 and segment X. Immediately following insulating segments 53 and 55 rings 113 and 115 are provided with a series of ten live segments 41 to 50 and 41' to 50' respectively, separated by insulating segments. The live segments 41 to 50 and 41' to 50' of each ring are strapped together and connected to two of the four wires comprising group 127, which as before stated are connected through the "range" magnets 126 to the windings of the magnets of the indicating units of the particular range and stock selected.

The remaining two wires of group 127 extend from a similar set of segments on the rotary distributor D'. The group of segments 41 to 50 and 41' to 50' comprise the "restoration" group for restoring the hundreds and units indicator to blank position at the indicator panel, by supplying a series of ten impulses thereto.

Ring 115 is provided with an extra contact Y following segment 50' which is connected to the winding of relay Y' to energize the same from negative battery 151, and thereby to connect ground 153 to the actuating ground line AG through the tongue of relay Y'.

Rings 114 and 116 are provided with solid segments 51 and 51' respectively arranged opposite the segments of the "restoration" group and opposite segment Y. These segments, 51 and 51', are connected to negative battery 151.

The rings 111 to 112 are each provided with insulating segments 57 and 58 respectively, opposite the segments of the restoration group. Following the segments 57 and 58 the rings 111 and 112 are provided with a second series of twenty segments numbered 21 to 40. The odd numbered segments of ring 111 are strapped together and connected to channel $C_1$ and the even numbered segments are likewise strapped together and connected to channel $C_2$. The segments 21 to 40 of ring 112 are separated by insulating segments so that when the transmitted impulses constituting the "answer" are supplied thereto, over channels $C_1$ and $C_2$ only the peak or central portion of the signal will be effective. This prevents any danger of signals of one polarity applied to one contact from lapping over on to the succeeding contact.

The odd numbered contacts 21 to 37 of ring 111 are also strapped together as are the even numbered contacts, the former being connected to one end of the winding of a polarized relay 155 and the latter to one end of the winding of a polarized relay 156. The opposite ends of the windings of relays 155 and 156 are grounded.

Contacts 21 to 40 are termed the "answer" group and control the transmission of the signals for the hundreds and units digits of the quotation.

Opposite the "answer" group, rings 113 and 115 are provided with a series of ten live segments separated by insulating segments, the live segments of ring 113 being designated by the odd numbers 21' to 39' and those of ring 115 by the even numbers 22' to 40'. The segments 21' to 39' of ring 113 are strapped together and connected to the hundreds wire of the four wire group 127 and segments 22' to 40' of ring 115 are likewise strapped together and connected to the tens wire of group 127. The odd numbered segments 21' to 39' and the even numbered segments 22' to 40' are termed the "regenerating" group of the hundreds and tens indicators respectively.

It should be noted that the segments 21' to 40' have their front edges substantially in line to the rear edges of the correspondingly numbered segments 21 to 40 of ring 111. This insures that the polarized relays 155 and 156 will have operated prior to the engagement of the brushes $b_2$ and $b_3$ with the regenerating segments, thus causing impulses corresponding to the full length of the regenerating segments to be supplied to the indicator magnets.

Opposite the regenerating segments, rings 114 and 116 are provided with solid segments 52 and 52', respectively, which are connected to the tongues of the polarized relays 155 and 156. The marking contacts of relays 155 and 156 are connected to battery 157 of negative polarity.

Following the segment 40', rings 115 and 116 have final segments Z', Z' and rings 111 and 112 have corresponding segments Z, Z. These segments when bridged by brushes $b_3$ and $b_1$ respectively, connect positive battery 158 to the windings of relays X' and Y' for returning the tongues thereof to the left hand contact and thereby to disconnect the battery 123 from the lines 124 and 125 and also to disconnect the ground 153 from the actuating ground line AG. The restoration of these relays to their normal position places the circuit in condition for the transmission of the succeeding signal.

The operation of the distributor and its associated selecting mechanism will now be described:

Assuming as before, that the stock selection is the "last" quotation of stock numbered 236, and that the brushes $b_1$, $b_2$ and $b_3$ are in their starting position, with brush $b_1$ bridging contacts 1, 1 and brushes $b_2$ and $b_3$ bridging insulating contacts 53, 54 and 55, 56 respectively. The single positive impulse corresponding to the "last" quotation is transmitted over channel $C_1$ and energizes the starting magnet SM, thus releasing the latch 159.

The starting magnet SM is normally unenergized due to the positive battery 150 connected thereto which opposes the positive battery applied through the contacts of relay 105. It will be remembered, however, that when a signal is transmitted over the line $L_1$ the relay 105 applies a negative battery to channel $C_1$ which assists battery 150 to operate the starting magnet. Upon release of the latch 158 the brushes $b_1$, $b_2$ and $b_3$ move in unison across the three sets of rings, The brushes move in synchronism with the incoming signals so that as the first signal is transmitted over line L₂ and repeated over channel C₂ to segment 2, brush b₁ passes on to segment 2. This segment being unconnected nothing occurs. When the brush b₁ engages segment three, if a signal is being transmitted over line L₁, relay 105 will connect negative battery across segment 3 and through the conductor connected thereto, to the winding of polarized relay 3'. The armature of this relay will then be moved to its marking or right hand contact. The right hand contact of each of the relays 3' to 18' is connected to the tongue of the succeeding relay. The right hand contacts of relays 19' and 20' are connected directly to the last or tenth wire of the groups 124 and 125 and the left hand contacts of each of the relays 3' to 20' are connected directly to the remaining wires of the groups 124 and 125.

If no signal was being transmitted over the line L₁ when the brush b₁ passed over contact segment 3, as in the case of the "last" quotation, positive battery would be applied to the winding of relay 3' and its tongue would be moved against its spacing or left hand contact, thus connecting one of the wires of the group 124 through the tongue of relay 3' to a conductor 160 connected to the tongue of relay X'. This prepares a circuit from one of the range magnets of the group 126, to the battery 123, the circuit being held open however, at the contact of the relay X'. This relay it will be recalled, was moved to its left hand or spacing contact by the positive battery 158 supplied to contacts Z, Z as the brush b₁ completed the proceeding cycle of operation.

As the brush b₁ passes over the succeeding odd numbered contacts and assuming no further signals are transmitted over the line L₁, the armatures of each of the odd numbered relays 5' to 19' move to their spacing or left hand contacts but since the tongue of relay 3' is also on its spacing contact no circuit is prepared for the remaining wires of group 124, to the battery 123.

Going back to the signals transmitted over line L₂, the second signal over this line is received as the brush b₁ reaches contact 4, thus causing negative battery to be supplied to the winding of relay 4', and thereby moving its tongue to the marking or right hand contact. Since only two signal impulses are required to make up the hundreds digit of the stock designating number, no further negative signals are supplied to the remaining even numbered relays 6' to 20' and their contact tongues are moved to spacing or left hand position by the positive battery applied by the relay 106.

It will be noted that a circuit has thus been prepared from the tongue of relay X', conductor 160, right hand contact of relay 4' and left hand contact of relay 6' to the second conductor of the group 125.

Similarly relay banks 121' and 122' of the second selecting unit which is connected to channels C₃ and C₄, would simultaneously prepare circuits through the third and sixth wires of the groups 124' and 125' respectively.

As the brush b₁ passes from the "selecting" group of segments it bridges contacts X, X thus applying negative battery to the relay X', whereby its contact tongue moves to the right and completes a circuit from the battery 123 to the selected wires of groups 124 and 125.

Figure 1B:
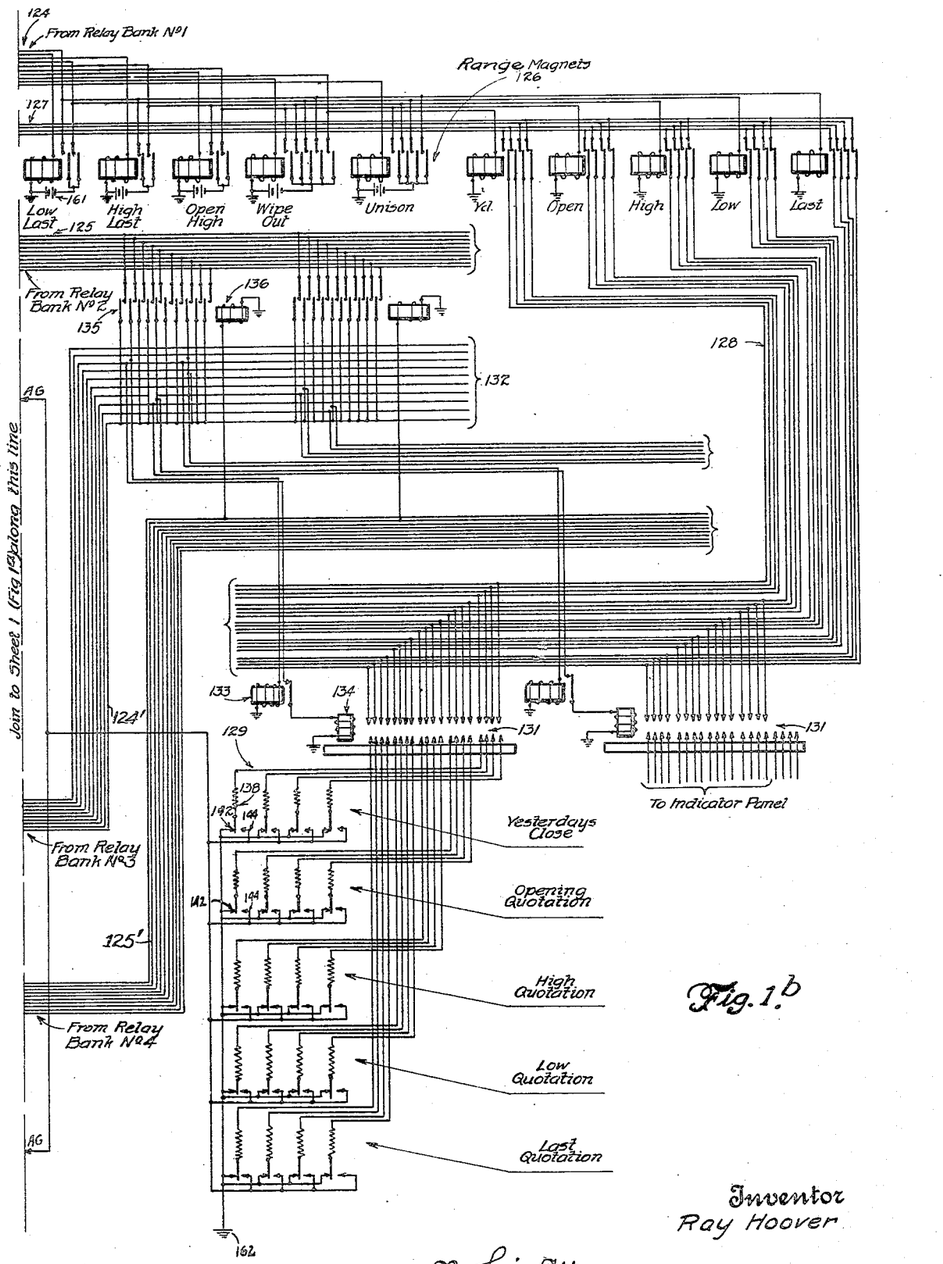

Referring to sheet two of Figure 1, it will be noted that each conductor of the group 124 is connected to one end of the winding of one of the "range" magnets 126, the opposite ends of the windings being grounded. Thus, conductor one of group 124 (counting from the top) is connected to the winding of the "last" selecting magnet, wire two to the winding of the "low-last" selecting magnet, wire three to the "high-last" magnet, wire four to the "low" magnet, wire five to the "high" magnet, wire six to the "open" magnet, wire seven to the "high-open" magnet, wire eight to the "yesterday's close" magnet, wire nine to the "wipe out" magnet and wire ten to the "unison" magnet. The operation of the "yesterday's close", "open", "high", "low" and "last" selecting magnets connects the four wires of the group 127 to each of the five groups of wires indicated at 128 which latter wires are connected through the multi-contact switches 131 with the windings of the indicator magnets.

In the present example, the connection of battery 123 to wire 1 of group 124, through the relay 3', causes the "last" selecting relay to operate thus connecting the four wires 127 to the group of four wires terminating at the indicator magnets which operate the hundreds, tens, units and fraction indicators of the "last" quotation.

The operation of the selecting magnet marked "low-last", connects the battery 161 through the contacts of this magnet to the windings of the "low" selecting magnet and the "last" selecting magnet, thus permitting the windings of the indicators of both of these groups to be connected to the lines 127. The "high-last" selecting magnet functions similarly with respect to the "high" and "last" groups of indicators and the "open-high" selecting magnet likewise connects the lines 127 to the "open" and "high" groups of indicators. The selecting magnet marked "wipe out" has five contacts and serves to connect battery to the windings of each of the "yesterday's close", "open", "high", "low" and "last" selecting magnets so as to enable all of the indicators to be operated for the particular stock selected and the "unison" selecting magnet permits all except "yesterday's close" indicators to be operated simultaneously.

Each of the wires of group 127 are connected to one of the sets of restoration segments of the rotary distributors D and D', one of the wires being connected to the restoration and regenerative segments of ring 113 for controlling the hundreds indicators and another to the similar segments of ring 115 to control the tens indicators. The remaining two wires are connected to similar segments of the rotary distributor D', to control the units and fractions indicators.

At the time battery is applied to the selected wire of group 124 to operate one of the "range" magnets, the same battery is applied through relay 6', and the second conductor of group 125 to the second contact of each of the multi-contact switches 135. Simultaneously battery is applied through relay banks 121' and 122' to the third wire of group 124' connected to the third horizontal conductor of the grid 132 and to the sixth wire of the group 125' for operating the switch 136 of the sixth group of vertical conductors of the grid. Upon operation of the selecting magnet 136 and closing of the contacts 135 thereof, the selected vertical conductor of the grid is connected to the battery 123.

The application of battery to one of the vertical conductors and to one of the horizontal conductors of the grid effects the closing of one of the switches 131, thus completing the circuit from the wires 127 to the indicator magnets of the particular range selected.

The operation of the range magnets and the closing of switch 131 occurs as the brush $b_1$ passes on to contacts X, X. Immediately following this the brushes $b_2$ and $b_3$ pass on to the restoration group of contacts and thereby supply a series of ten negative impulses from the battery 151, solid segments 51 and 51', brushes $b_2$ and $b_3$ of each of the distributors D and D' and the wires 127 to the indicator magnets thus stepping each indicator drum around until its blank portion comes in front of the window 130 of the indicator panel. Thereupon, the ground connection for the indicator magnet is broken through passage of the brush 141 off of the grounded segment 142 and on to the ungrounded segment 144. The segment 144 is connected by the actuating ground wire AG to the tongue of relay Y'.

When the brush $b_3$ leaves the last segment 50' it moves on to contact segment Y, thus completing a circuit from the battery 151 to the winding of the relay Y' causing its contact tongue to be moved to the right and thereby completing the circuit to the actuating ground at 153. The indicator magnets are thus again grounded so as to respond to the succeeding "answer" signal train transmitted over the line for resetting the indicators to their new position.

The first "answer" signal over channel $C_1$ is received as the brush $b_1$ starts onto segment 21. This signal is regenerated through polarized relay 155 and segment 21' of ring 113 and the regenerated signal is conducted by one of the wires 127 to the hundreds indicator magnet of the chosen "range". The succeeding signal is transmitted over channel $C_2$ as the brush $b_1$ passes onto segment 22 and after being regenerated through polarized relay 156 and segment 22' of ring 115 is conducted to the magnet of the tens indicator. Likewise the units and fractions indicators are operated through channel $C_3$ and $C_4$ and distributor D'.

At the conclusion of the transmission of the "answer" the brushes $b_1$ and $b_3$ engage contact segments Z and Z' and by applying positive battery to the windings of relays X' and Y' return their armatures to the normal or left hand position. This removes the battery 123 from the range selecting magnets 126, grid control magnet 136 and stock magnets 133 and 134, thus restoring the contacts controlled by these magnets to their normal or open position.

The relays 3' to 20' need not be restored to any predetermined position since they are positively reset in the proper position during the transmission of the succeeding selecting impulses.

In Figure 1b, the contacts 142 of the indicator windings are shown connected to a common ground at 162 and the contacts 144 are shown connected to the common actuating ground wire AG. It is to be understood however, that a separate actuating ground may be provided for the hundreds indicator magnets, for the tens indicator magnets, for the units indicator magnets and for the fractions indicator magnets. In this case the relay Y' would operate a four contact switch connected to each of the actuating lines.

In the operation of the above described system it is often desirable after the close of the stock exchange each day to restore all of the indicators to their blank position in preparation for the succeeding day's business. This is readily accomplished by transmitting a "wipe out" signal for each stock. The "wipe out" signal as stated before, operates the "wipe out" selecting magnet which connects the magnets of all the indicators of the particular stock selected to the lines 127 and thus, during the restoration period, causes all of the indicator drums to be reset to "blank" position.

It is also the practice to set up the "yesterday's close" quotation each morning before the exchange opens and to test out the system by transmitting predetermined test signals. After the test has been completed the indicators which have been set during such testing may be returned to blank without disturbing the "yesterday's close" quotation by means of the "unison" signal. The "unison" signal operates the "unison" magnet which completes the connections for operating all of the indicator magnets of a particular stock with the exception of the "yesterday's close."

After the indicators representing the "high", "low" and "last" quotations have once been set up for a particular stock the value of these quotations in most cases will vary only in the fractions and/or units value as subsequent sales take place. It is not necessary, therefore, in such cases to operate the hundreds or ten indicators and in some cases only the fractions indicators need to be reset. However, with the receiving system shown in Figure 1, all of the indicators of the particular range selected are automatically restored to blank position each time any change is to be recorded in that particular range. This necessitates the retransmission of the full quotation.

Figure 5:
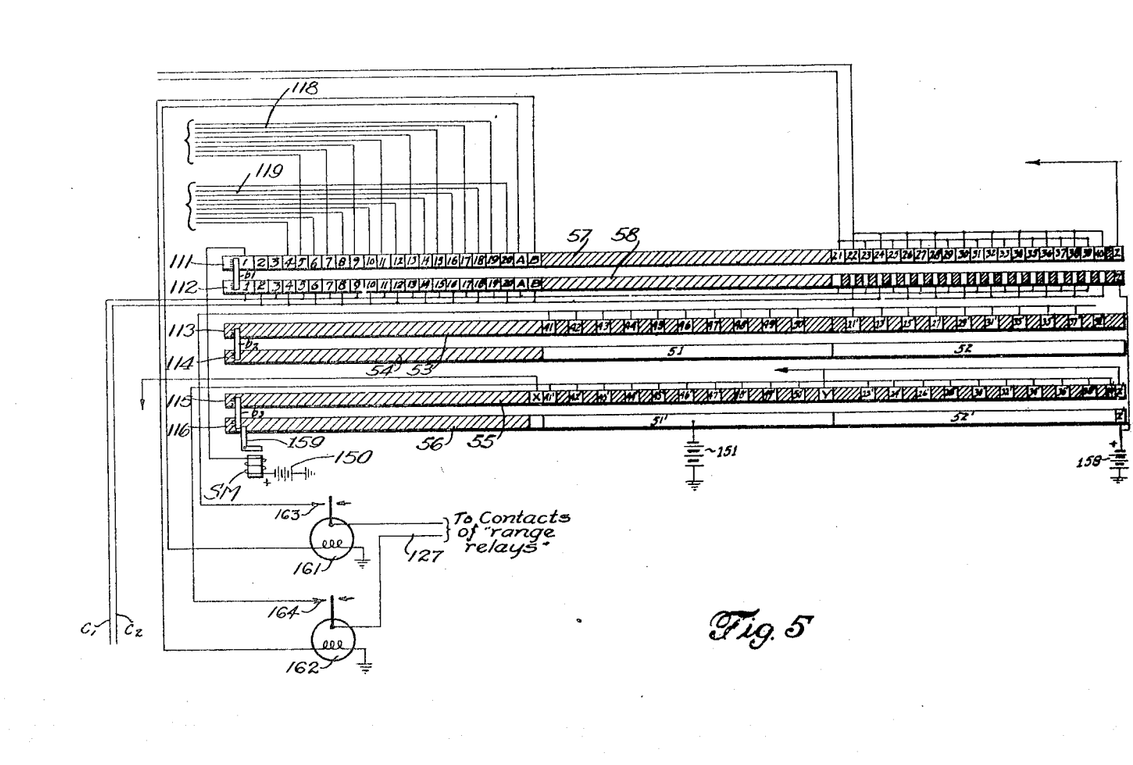
Figure 5 shows a modified arrangement of the distributor and auxiliary relays for enabling the restoration signals to be omitted.

In Figure 5, I have shown an arrangement whereby the restoration impulses may be omitted for all of the indicators of the range selected which it is not desired to reset.

The arrangement of the segments of the distributor shown in Figure 5 is the same as in Figure 1a except that segment X has been removed to ring 115 and in its place two segments A and B are inserted in rings 111 and 112. Segments A and B of ring 112 are connected to channels $C_1$ and $C_2$ respectively and segments A and B of ring 111 are connected to the windings of two polarized relays 161 and 162, respectively.

The wires of group 127 which extend from the segments of the restoration and answer groups of rings 113 and 115 are connected to the marking contacts 163 and 164 of relays 161 and 162, respectively, and are continued to the "range" relays through the tongues of relays 161 and 162. Relay 161 controls the transmission of the restoration impulses to the hundreds indicators and relay 162 controls the transmission of the restoration impulses to the tens indicators. Similar relays associated with distributor D' control the units and fractions restoration impulses.

With this arrangement when no signals representing the hundreds digit of the quotation are to be transmitted, a signal is sent over line $L_1$ of such nature as to apply negative battery to the channel $C_1$, as brush $b_1$ passes onto segment A. This negative battery operates relay 161 to move the switch tongue thereof to its right hand or spacing contact and thereby disconnect the restoration segments 41 to 50 from the hundreds wire of group 127.

Likewise when no signals representing the tens digits of the quotation are to be sent a signal is transmitted over line $L_1$ and hence through channel $C_2$ to apply negative battery to contact B, to operate relay 162 and thereby disconnect the restoration segments 41' to 50' from the tens wire of group 127.

In case answer signals are to be transmitted representing the hundreds or tens digits of the quotation, the impulses over lines $L_1$ will be of such polarity as to apply positive battery to the relays 161 and 162, through control channels $C_1$ and $C_2$, respectively, whereby to connect the segments of the restoration groups through the tongues of relays 161 and 162, to the wires of group 127.

In this manner any indicator may be reset to blank or retained in its original position by means of signals transmitted over the controls channels and received upon segments A and B.

It will be appreciated of course, that many changes may be made in the arrangement and construction of the rotary distributor and in the nature of the selecting and indicating means as well as in the general circuit arrangement, and I contemplate all such changes as come within the scope of the appended claims.

What I claim is:

1. An electrical indicating device comprising a multitude of groups of indicators at a receiving station each group including a plurality of sets of indicators, a plurality of devices cooperating to select a particular set or sets of a particular group of said indicators, a control channel for each of said selecting devices for the transmission of selecting signals to said receiving station, each selecting device comprising a relay chain embodying relays arranged to respond successively to signals over the channel corresponding thereto for preparing circuits to effect selection directly, a rotary distributor for receiving said transmitted signals from said control channels and distributing the same in successive order to the relays of said chains, a start-stop device for said rotary distributor and means for starting said distributor in response to the first transmitted impulse of a predetermined polarity of said selecting signals.

2. An electrical indicating device comprising a multitude of groups of indicators at a receiving station, each group including a plurality of sets of indicators, a plurality of devices cooperating to select a particular set or sets of a particular group of said indicators, a control channel for each of said selecting devices for the transmission of. selecting signals to said receiving station, each selecting device comprising a relay chain embodying relays arranged to respond successively to signals over the channel corresponding thereto for preparing circuits to effect selection directly, a rotary distributor for receiving said transmitted signals from a plurality of said control channels and distributing the same in successive order to the relays of the associated relay chain, a start-stop device for said rotary distributor and means for starting said distributor by signals received over one of said plurality of channels and bringing it into synchronism with said selecting signals received over each of said plurality of channels each time a train of selecting signals is transmitted.

3. An electrical indicating device comprising a multitude of groups of indicators at a receiving station, each group including a plurality of sets of indicators, a plurality of selecting devices, a control channel for each selecting device, means for transmitting selecting signals over said channels, each selecting device comprising a plurality of elements for responding successively to signals received over the channel corresponding thereto for preparing circuits to effect selection directly, a rotary signal distributor for receiving said selecting signals and distributing them in successive order to the elements of said selecting devices to select a particular set or sets of a particular group of indicators and means for transmitting answer signals over said channels, said rotary distributor receiving said answer signals, and means cooperating with said distributor to regenerate said signals, said distributor distributing them from the regenerating means to the selected set or sets of indicators.

4. An electrical indicating device comprising a multitude of groups of indicators at a receiving station, each group including a plurality of sets of indicators, each indicator having a plurality of positions in one of which it is adapted to be set by a series of restoration impulses, a plurality of selecting devices, a control channel for each selecting device adapted to have selecting signals and answer signals transmitted thereover, each selecting device comprising a relay chain embodying relays arranged to respond successively to signals over the channel corresponding thereto for preparing circuits to effect selection directly, a rotary distributor associated with said control channels for distributing said selecting signals successively to the relays of said chain to select a particular set or sets of a particular group of indicators and for distributing said answer signals to the selected set or sets of indicators, means at the receiving station for setting up locally a train of restoration impulses said rotary distributor also acting to distribute said train of restoration impulses to said indicators prior to the distribution of said answer signals thereto.

5. An electrical indicating device comprising a multitude of groups of indicators at a receiving station, each group including a plurality of sets of indicators each indicator having a plurality of positions in one of which it is adapted to be set by a series of restoration impulses, a plurality of selecting devices, a control channel for each selecting device adapted to have selecting signals and answer signals transmitted thereover, each selecting device comprising a relay chain embodying relays arranged to respond successively to signals over the channel corresponding thereto for preparing circuits to effect selection directly, a rotary signal distributor associated with said control channels for distributing said selecting signals in successive order to the relays of said chain to select a particular set or sets of a particular group of indicators and for distributing said answer signals to the selected set or sets of indicators, and means controlled by said distributor for setting said indicators in a predetermined position prior to the distribution of said answer signals thereto.

6. An electrical indicating device comprising a multitude of groups of indicators at a receiving station, each group including a plurality of sets of indicators, a plurality of selecting devices, a control channel for each selecting device, adapted to have selecting signals and answer signals transmitted thereover, each selecting device comprising a relay chain embodying relays arranged to respond successively to signals over the channel corresponding thereto for preparing circuits to effect selection directly, a rotary signal distributor associated with said control channels for distributing said selecting signals in successive order to the relays of said chains to select a particular set or sets of a particular group of indicators and for distributing said answer signals to the selected set or sets of indicators, and means independent of signals transmitted over said control channels for setting said indicators to a predetermined position prior to the distribution of said answer signals thereto.

7. An electrical selecting system for selecting a particular set or sets of indicators of a multitude of groups of indicators at a receiving station comprising circuits for selecting a particular set or sets of indicators of a particular group thereof, a plurality of banks of selecting polarized relays, a control channel associated with each of said banks of relays, means for transmitting selecting signals comprising spaced impulses over each of said channels, a distributor for supplying impulses of one polarity to certain of the relays of each bank, in accordance with the signal impulses transmitted over the associated channel and means for supplying impulses of the opposite polarity to the remaining relays of said bank said relays partially completing said selecting circuits.

8. An electrical selecting system for selecting a particular set or sets of indicators of a multitude of groups of indicators at a receiving station comprising circuits for selecting a particular set or sets of indicators of a particular group, a plurality of banks of selecting polarized relays, a control channel associated with each of said banks of relays, means for transmitting selecting signals comprising spaced impulses over each of said channels, a rotary distributor having contacts connected to said control channels for supplying impulses of one polarity to the windings of certain of the polarized relays of each bank in accordance with the signal impulses transmitted over the associated channel for preparing predetermined ones of said selecting circuits, a relay in said circuit, contacts on said distributor for operating said relay to complete said predetermined selecting circuits and other contacts on said distributor for subsequently restoring said relays to their normal unoperated position.

9. An electrical selecting apparatus comprising a plurality of rotary signal distributors, a plurality of banks of relays associated with each distributor, means for transmitting certain signals of a selecting combination to each of said distributors, each distributor in turn being arranged to distribute certain of the signals received to predetermined relay banks to prepare selecting circuits from each bank and means independent of line signals comprising a segment on each said distributors for completing said selecting circuits after the completion of the transmission of the selecting signals.

10. An electrical selecting apparatus comprising a plurality of selecting circuits, a plurality of signal receiving units to be selected through said circuits, a plurality of rotary signal distributors, a plurality of banks of polarized relays associated with each distributor, a control channel for each bank of relays, means for transmitting selecting signals over said channels to said distributors for distribution to said polarized relays to prepare predetermined ones of said selecting circuits each, when completed, select certain receiving units, means comprising a segment on each of said distributors for completing said selecting circuits after the completion of the transmission of the selecting signals, to select said units and connect said predetermined circuits to the contacts of said rotary distributor for the transmission of signals thereover to said selected units and means comprising a separate segment on each of said rotary distributors for disconnecting said selected circuits from said distributors after the completion of the transmission of said signals.

11. An electrical selecting apparatus comprising selecting circuits a plurality of rotary signal distributors, a plurality of banks of polarized relays associated with each distributor, a control circuit for each bank of relays, means for transmitting selecting signals over said channels to said distributors for distribution to said polarized relays said relays preparing predetermined ones of said selecting circuits, means comprising a segment on each of said predetermined distributors for completing said selecting circuits after the completion of the transmission of the selecting signals, means for transferring said control channels to the completed selecting circuits for the transmission of signals thereover and means comprising a separate segment on said rotary distributor for interrupting said selected circuits.

12. An electrical indicating device comprising a multitude of groups of indicators at a receiving station, each group including a plurality of sets of indicators, means for selecting a particular set or sets of indicators of a particular group and means for operating said selected indicators, said last mentioned means comprising a rotary signal distributor, control channels for transmitting indicator operating signals to said distributor and means including a separate segment of said distributor for each impulse of said operating signals for regenerating said transmitted signals and distributing the regenerated signals to the selected indicators, the duration of said regenerated signals being dependent solely upon the length of said segments.

13. An electrical indicating system comprising a large number of groups of indicators at a receiving station, each group including a plurality of sets of indicators, selecting apparatus for selecting predetermined ones of said indicators, a control channel for each indicator of an individual set of indicators, means for transmitting indicator selecting signals over each of said channels, said signals comprising groups of interspaced positive and negative impulses of varying numbers, the impulses transmitted over any channel being of the same polarity and means for selecting a particular set of indicators of a particular group in accordance with the transmitted signals, said means comprising a rotary signal distributor having contacts connected to said control channels, said distributor during each cycle of operation supplying a predetermined number of impulses to said selecting apparatus irrespective of the number of impulses comprising the selecting signals, the polarity of such impulses supplied by said distributor being dependent upon the transmitted impulses.

14. An electrical indicating system comprising a large number of groups of indicators at a receiving station, each group of indicators including a plurality of sets of indicators, selecting apparatus for selecting predetermined ones of said indicators, a control channel for each indicator of an individual set of indicators, means for transmitting indicator selecting and operating signals over each of said channels, said signals comprising groups of interspaced positive and negative impulses of varying numbers, the impulses transmitted over any channel being of the same polarity, and means for selecting a particular set of indicators of a particular group and for operating the selected indicators in accordance with the transmitted signals, such means comprising a rotary signal distributor having contacts connected to said control channels, said distributor completing each cycle of operation in a predetermined time irrespective of the number of impulses comprising the indicator selecting and indicator operating signals.

RAY HOOVER.